INVENTOR
JACQUES FLICHY
BY
Woodhams, Blanchard & Flynn
ATTORNEYS

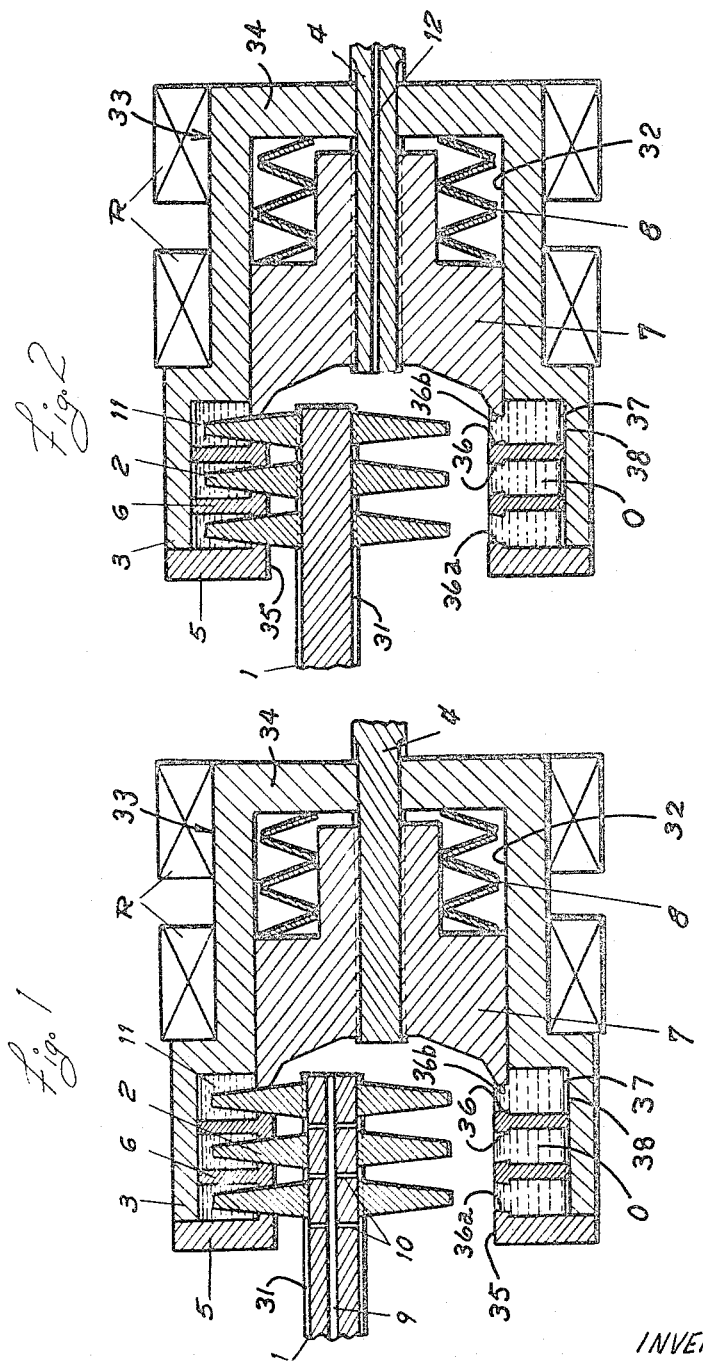

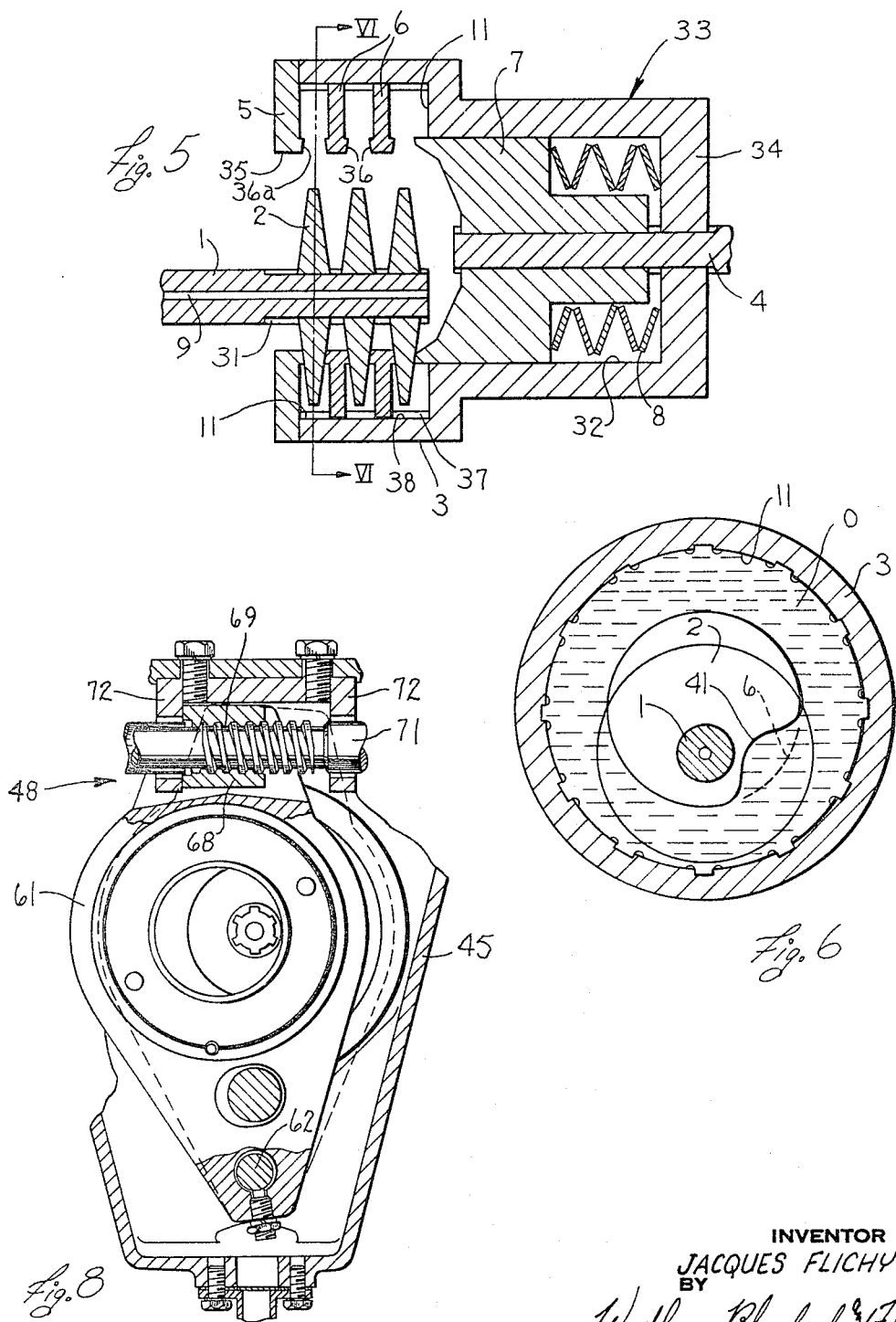

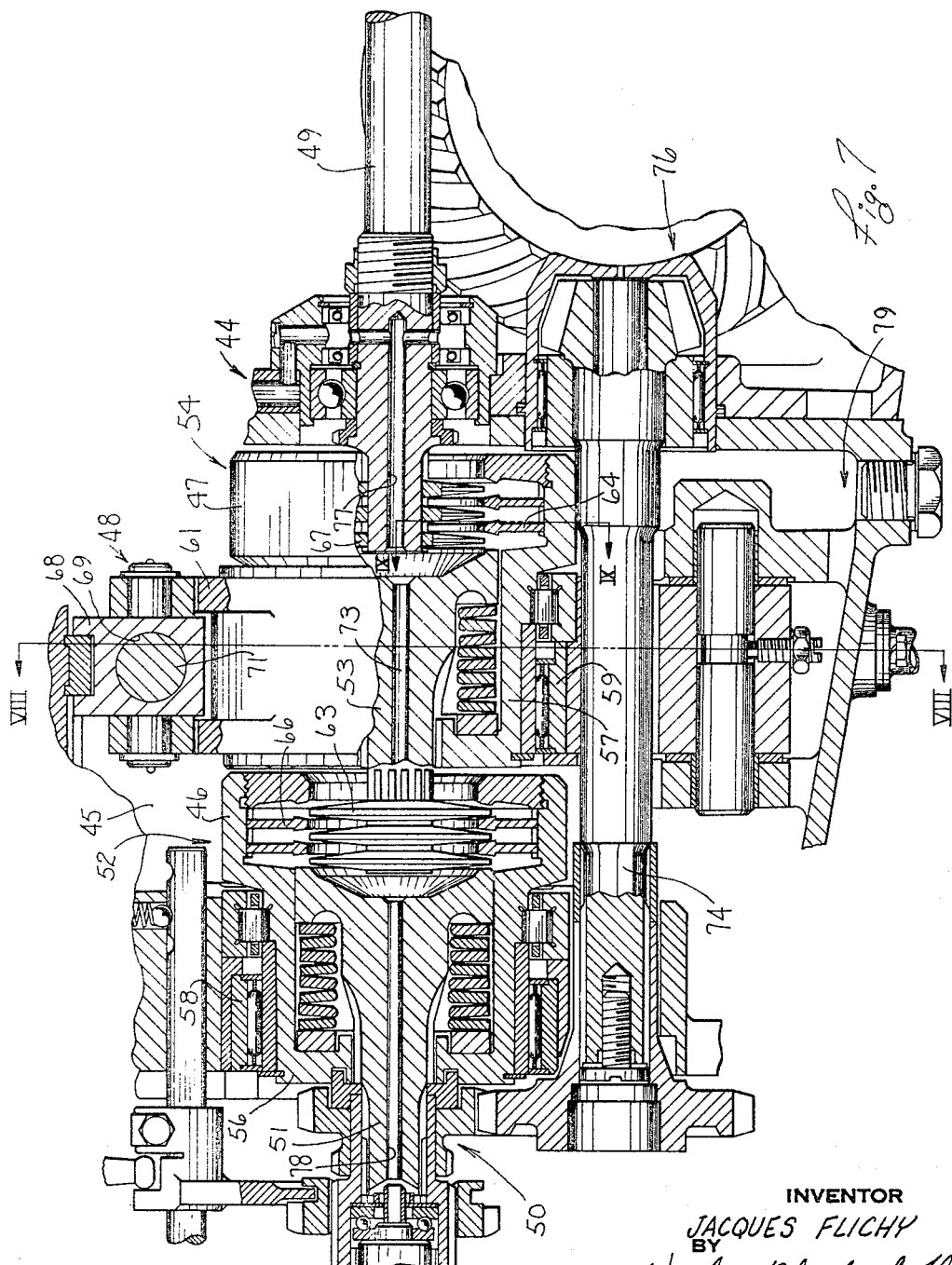

United States Patent Office 3,381,777
Patented May 7, 1968

3,381,777
LUBRICATION OF SPEED-CHANGING MECHANISM
Jacques Flichy, Paris, France, assignor to Ateliers Metallurgiques de Saint-Urbain, Fronville, Haute-Marne, France, a company of France
Continuation-in-part of application Ser. No. 312,970, Oct. 1, 1963. This application June 20, 1966, Ser. No. 558,916
Claims priority, application France, Oct. 2, 1962, 911,044
10 Claims. (Cl. 184—6)

This application is a continuation-in-part of application Ser. No. 312,970, filed Oct. 1, 1963, for "Lubrication of Speed-Changing Mechanism," now abandoned.

The present invention relates to the lubrication of speed-changing mechanisms of the type comprising a drive shaft along which tapered disks are adapted to slide in splines formed outwardly on said drive shaft, the combined assembly being disposed within a drum which is partially closed by an annular cover, and further comprising rings adapted to slide along internal splines formed in said drum, said rings being each provided with an annular enlargement on the internal rim thereof and being respectively individually interposed between said tapered disks. Means consisting of a resilient washer is provided for pressing the so formed stack of disks and rings together and also means is provided for modifying the radial distance between the axis of said drive shaft and the axis of said drum. The drum is rotatably supported and it is attached to a driven shaft which extends axially therefrom.

In speed-changing mechanisms of this type, the changing of the eccentric displacement of the drive shaft relative to the axis of the drum enables the annular enlargements of the rings to penetrate radially between the tapered disks on one side of the drive shaft and to be released therefrom on the other side, with the result that the drum rotates at a speed which becomes progressively lower than that of the drive shaft as the annular enlargements come closer to said drive shaft.

Speed-changing mechanisms of this type which have been known up to the present time are subject to the disadvantage that either they transmit only low power outputs or they are subject to rapid wear of the friction members when transmitting high power outputs. Thus, it is an object of the present invention to overcome this disadvantage.

The present invention makes it possible to overcome this disadvantage and is accordingly characterized in that, at the moment of starting, a means provides for a quantity of oil to flow into the drum and said oil is allowed to accumulate until it overflows from the drum through the annular cover plate. Rotation of the disks effects the rotation of the rings and drum, which causes the oil to form into the shape of a ring which is located within the annular space defined within the drum. The flow of oil into the drum is substantially continuous and the excess quantity which overflows is collected so that it can be recycled.

The device as described hereinafter is capable of performing the objects of the invention without any waste of lubricant. Also the oil continuously cools the friction causing members, which are in contact with the ring of oil along portions of their peripheries. Thus, since said members are subjected to friction only along a limited zone of said peripheries, this arrangement is very favorable to the cooling of said members.

In addition, the device embodying the present invention provides for the lubrication and cooling of the drive shaft and adjacent parts. In fact, the volume of that portion of each tapered disk, which is interleaved with the sliding rings and is immersed between said rings in the ring of oil, causes a corresponding volume of oil to escape and, consequently, as a result of a substantially radially inwardly directed motion, to come into contact with the tapered disks and then reach the shaft. More specifically, the oil ring in the drum tends to form a radially inwardly projecting hump directly behind (upstream of) the portions of the disks immersed in the oil ring, and this hump definitely enhances the lubrication of the entire assembly within the drum.

Finally, the present invention provides for automatic regulation of the quantity of oil which is caused to flow into the drum, inasmuch as the greater the eccentric displacement of the drive shaft relative to the axis of the drum, the greater the sliding action between the disks and rings, with the resulting need for a more abundant circulation of oil. The tapered disk which is located nearest the annular cover plate unmasks the opening of said annular cover plate to a greater extent, as the axes of the driven and driving shafts are moved radially away from each other, thereby permitting a greater quantity of oil to pass out of the drum mechanism, which quantity of oil is consequently renewed as required. In other words, the flow rate of the oil supplied into the drum is increased as the eccentric displacement, hence the sliding action, is increased.

A clear understanding of the present invention will be gained from the description which follows, reference being made therein to the accompanying drawings, in which:

FIGURE 1 is a diagrammatic longitudinal sectional view of a speed-changing unit provided with lubrication means which is designed for the practical application of the present invention.

FIGURE 2 is a modified form of the invention in which a different manner of supplying lubrication oil is provided.

FIGURE 5 is a central sectional view similar to the sectional views appearing in FIGURES 1 and 2 and illustrating a different arrangement of parts and a modified manner of supplying lubrication oil.

FIGURE 6 is a sectional view substantially as taken along the line VI—VI in FIGURE 5.

FIGURE 7 is a central cross-sectional view of a modified speed-changing device embodying the invention.

FIGURE 8 is a sectional view taken along the line VIII—VIII in FIGURE 7.

Figure 3:
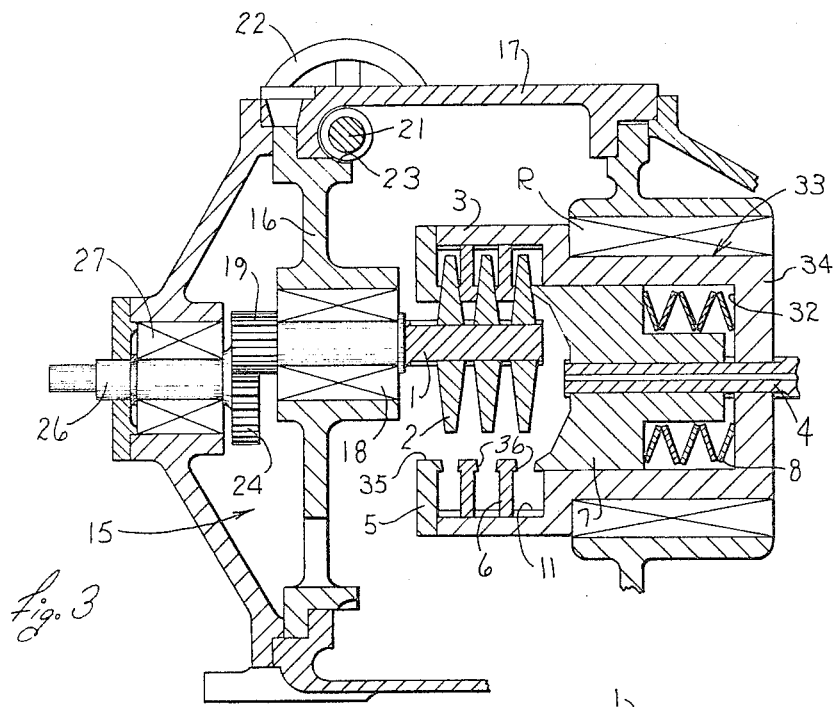
FIGURE 3 is a schematic, substantially centrally cross-sectional view of a structure for effecting relative radial movement between the drive shaft and driven shaft.

For convenience in description, the terms "upper," "lower" and words of similar import will have reference to the structure of the invention as appearing in FIGURES 3 and 7. The terms "inner," "outer" and derivatives thereof will have reference to the geometric center of the speed-changing device of the invention and parts thereof.

Reference being made to FIGURE 1, it is observed that the speed-changing mechanism is essentially composed of a drive shaft 1 provided with external splines 31 along which spaced tapered disks 2 are adapted to slide, the combined assembly being housed in a drum 3 which is coaxially connected to and rotatable with a driven shaft 4. The drive shaft 1 is designed to extend into the drum 3 through the central opening 35 in a fixed, annular cover plate 5. A series of axially slidable rings 6 are respectively interposed between and interleaved with the axially slidable and tapered disks 2. Each of said rings 6 is provided with enlarged, annular rims 36 which are located near the radially inner edges thereof. The first (or leftwardmost) annular rim 36a is integral with the cover plate 5, and the last rim 36b is integral with a tulip-shaped component 7 which is located within a recess 32 communicating with the interior (or rightward) end of the drum 3. Said tulip-shaped component 7 is slidably, but nonrotatably, supported upon the inner end of the driven shaft 4, which may be splined for this purpose. Said shaft 4 is also nonrotatably connected to the rightward extension 33 of the drum 3 which houses the recess 32. Alternatively, the component 7 may be rigidly secured to, or integral with, the shaft 4 which then exceeds slidably, but nonrotatably, through the end wall 34 of the extension 33. The component 7 is thrust axially toward the cover plate 5 by resilient means, such as the spring washers 8. The intermediate rings 6, between the cover plate 5 and component 7, are adapted to slide within the drum 3 by virtue of internal splines 37 formed in the radially inner wall 38 of the drum 3. The drum 3 and its extension 33, hence the speed-changing unit as a whole, are rotatably carried in roller bearings R, which encircle the annular extension 33 of the drum 3.

It is known that the operation of a speed-changing mechanism of this type is usually controlled by varying by suitable means the distance between the axis of the drive shaft 1 and the axis of the drum 3. Consequently, the transmission ratio, which is equal to one if this distance is zero, varies progressively as the distance between the axis of said drive shaft 1 and drum 3 is varied, hence, as the enlarged portions of the rings 6 penetrate between the spaced tapered disks 2.

The relative radial movement of the drive shaft 1 (FIGURE 3) with respect to the drum 3 may be effected by a mechanism 15 including a circular bearing support 16 which is rotatably mounted within the outer casing 17 which houses the drum 3 and supports the bearings R. The drive shaft 1 is rotatably and eccentrically supported by the bearings 18 within the bearing support 16, and a pinion 19 is secured to and rotatable with the outer or leftward end of the drive shaft 1. A worm 21, which is connected to and driven by the hand wheel 22, is rotatably supported upon the casing 17 for engagement with gear teeth 23 along the periphery of the bearing support 16.

The drum 3 and drive shaft 1 are both eccentric with respect to the cylindrical casing 17. The eccentricities of the drum 3 and the shaft 1 are such that, by rotating the support 16, the disks 2 can be moved into and out of concentricity with the rings 6, whereby the radial spacing between their axes is varied.

The pinion 19 is engaged with a driving gear 24 mounted upon the input shaft 26 which is rotatably and concentrically supported by the bearings 27 upon the casing 17. The eccentricity of the shaft 1 with respect to the axis of the input shaft 26 (hence the drum 3) is such that the pinion 19 and the drive gear 24 remain in continuous engagement.

The foregoing structure is disclosed in further detail in Jorgensen Patent No. 2,815,670.

It will be seen that, by rotating the hand wheel 22, the amount of eccentricity between the disks 2 and rings 6 can be varied while maintaining a continuous engagement therebetween, as well as a continuous driving engagement between the gear 24 and pinion 19.

It follows from the foregoing that the surfaces on the rings 6 and the disks 2 (FIGURE 6), which are subjected to wear and to heating as a result of friction, are comprised of or closely adjacent to the enlarged rims 36 (FIGURE 5) of the rings 6 and the corresponding, engaged portions of the tapered disks, which are always located within the annular space 11 defined by the inner wall 38 between the component 7 and the annular cover plate 5 within the drum 3. Thus, these surfaces are always disposed within the ring O of oil which is urged to fill the space 11 during normal operation of the speed changer.

As shown in FIGURE 1, provision has been made for introducing oil through a passageway 9 which preferably extends axially through the drive shaft 1 so as to open through the inner end of the shaft 1 and also to communicate with radial passageways 10, which extend radially from axial passageway 9 through the periphery of shaft 1.

It nevertheless remains understood that it would be possible, without undue inconvenience, to dispense with either the radial passageways 10 or the terminal opening provided in the axial duct 9 at the internal extremity of the drive shaft.

The above-mentioned passageways provide a means of introducing oil inside the drum 3 while the speed changer is in operation. The quantity of oil accumulates under centrifugal action within the annular space 11 so as to form a ring O of oil, as shown in FIGURE 6, which reaches the enlarged portions 36 of the rings 6 and in which are immersed the parts of the rings 6 and disks 2 which are subjected to friction. As the oil supply is continued, the oil overflows through the opening 35 in the annular cover plate 5 and can be collected and recirculated by any known means, not shown.

As shown in FIGURE 6, a hump 41 of oil forms in the oil ring O upstream of the region of maximum immersion of the disks 2 in the oil ring O, and said hump projects radially inwardly of the rings 6 along the surfaces of the disks 2. The extent and configuration of the oil hump 41 is believed to be about as shown in FIGURE 6. However, regardless of its exact shape, said hump 41 is known to provide for the satisfactory lubrication and cooling of the shaft 1 and adjacent portions of the disks 2. The portion of the hump 41 adjacent the upper plate 5 will, under normal circumstances, tend to overflow through the opening 35 in the cover plate 5.

In the power transmitting and speed-changing device of the invention, both circumferential and radial slippage will occur between the engaging surfaces of the driven rings 6 and driving disks 2. Such slippage will produce heat. However, as seen in FIGURE 6, the areas of engagement between the rings and disks are immersed in oil, which is circulated through the speed changer at a sufficient rate to minimize wear and carry off the heat. Moreover, said areas of engagement will always have a thin film of oil therebetween so that metal to metal contact is virtually precluded.

The modified speed changer of FIGURE 2 has most of the structure disclosed in FIGURE 1, except for the axial passageway 9 and radial passageways 10, which have been omitted. Instead, a central passageway 12 is formed axially through the driven shaft 4. This change in the oil supply does not alter the utilization and operation of the speed-changing mechanisms of the present invention.

Figure 4:
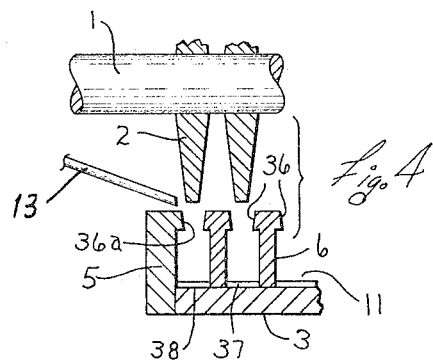
FIGURE 4 is a fragment of FIGURE 1 showing a modified structure for supplying lubrication oil.

The fragment of a modified speed changer shown in FIGURE 4 has an oil supply pipe 13 which extends through the opening 35 in the cover plate 5 and, accordingly, eliminates the need for passageways in either of the shafts 1 and 4, as shown in FIGURES 1 and 2, respectively.

The speed changer in FIGURE 5 is primarily intended to show an oil supply passageway 9 through the drive shaft 1 without the radial passageways 10 of FIGURE 1. However FIGURE 5 also illustrates an embodiment wherein maximum overlap of the disks 2 with the rings 6 is in the opposite direction from that shown in FIGURES 1 and 2.

In the foregoing embodiments, the ring of oil is created automatically within the annular space 11 and the depth thereof is determined by the diameter of the opening 35 in the annular cover plate 5. Those parts which are subjected to rubbing friction are lubricated and therefore cooled by the oil with a high degree of efficiency. Moreover, the quantity of oil in circulation may be limited to that which is necessary for these lubricating and cooling functions, and, in addition, those portions of the tapered disks 2 which are immersed in the oil ring O between the spaced rings 6 cause a certain volume of oil to form a hump which comes into contact with the rings and the radially inner portions of the disks to lubricate them and the drive shaft 1. Finally the figures clearly show that the first or outer disk closes off the opening in the annular cover plate to a greater extent as the eccentric displacement of the drive shaft 1 is reduced. In fact, when the drive shaft and drum are concentric, the opening 35 is blocked by the leftward disk (FIGURE 1).

It should be noted that, in the case of a complete unit, that is to say a double unit, a particularly advantageous arrangement consists in bringing the oil into the primary system of the unit through the drive shaft 1 (as shown in FIGURE 1) and into the secondary system through the driven shaft 4 (as shown in FIGURE 2). In this said double unit, the two shafts have stationary axes and they are readily accessible for the provision of passageways connectible to a source of oil.

More specifically, and as shown in FIGURES 7 and 8, the transmission assembly 44 comprises a pair of speed-changing units coupled in series with and between the input shaft 49 and the gear train 50. The front speed changer 52, which includes the front drum 46 and front driven shaft 51, may be substantially identical with the speed changer disclosed in FIGURE 2 and described above. However, the front drive shaft of the speed changer 52 is actually the driven shaft 53 of the rear speed changer 54 which includes a rear drum 47 and which may also be substantially identical with the speed changer disclosed in FIGURE 5. The rear driven shaft 53 and rear drum 47 are moved radially with respect to the front drum 46 and the input shaft 49 by a shift mechanism 48.

The frontward extensions 56 and 57 of the drums 46 and 47, respectively, are encircled by and rotatably supported within the bearings 58 and 59, respectively, which are mounted within the assembly casing 45 and the pivot member 61 of the shift mechanism 48. The pivot member 61 is movable between its solid line and broken line positions of FIGURE 8, whereby the drum 47, its extension 57 and the rear driven shaft 53 can be moved in a substantially horizontal direction. The pivot member 61 is supported near its lower end upon the casing 45 by the pivot pin 62.

Accordingly, the front disks 63, which are supported upon the rear driven shaft 53, and the rear rings 64, which are supported within the rear drum 47, can be simultaneously pivoted with the pivot member 61 and with respect to the front rings 66 and rear disks 67. As a result, the eccentricity, if any, between the driven shafts 51 and 53 and the drums 46 and 47, respectively, will be identical because the front driven shaft 51 is coaxial with the input shaft 49, which supports the rear disks 67, and the rear driven shaft 53 is concentric with the rear drum 47.

A nut 68 is piovtally supported within the upper end of the pivot member 61 for movement around an axis perpenducular to its opening 69 and parallel with the pivot pin 62. A screw 71, which is threadedly received into the opening 69 and supported upon the casing 45 by bearings 72, may be connected by linkage means, not shown, to any convenient control mechanism for effecting its rotation in response to either manual or automatic controls.

The input shaft 49 may be connected in any conventional manner to a prime mover, such as an internal combustion engine, and the front driven shaft 51 may be connected by the gear train 50 to a countershaft 74, which is in turn connected by the differential 76 to the wheels of the vehicle.

The input shaft 49 has a lengthwise and central oil passageway 77, and the front driven shaft 51 has a lengthwise and central oil passageway 78, whereby oil under pressure can be introduced into the drums 47 and 46, respectively, for the purpose of lubricating the disks and the rings in the speed changers 54 and 52, in substantially the same manner and for the same purposes as described above with respect to the speed changer disclosed in FIGURE 1. The oil which overflows from each of the drums 46 and 47 can move by gravity into the sump 79 of the casing 45 foe collection and subsequent recycling as described above with respect to the speed changer of FIGURE 1.

The rear driven shaft 53 may contain a central, oil passageway 73 so that it is interchangeable with the front driven shaft 51. It is also available, although not essentially, for moving the oil between the disk and ring assemblies of the two speed changers.

Figure 9:
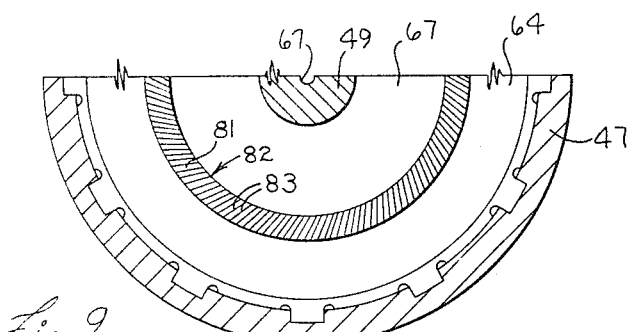
FIGURE 9 is a sectional view taken along the line IX—IX in FIGURE 7.

As shown in FIGURE 9, the axial surface 81 on the rim 82 of each ring in the units 52 and 54 of FIGURE 7, which axial surface engages an axial surface on one of the disks 63 and 67, may be provided with a plurality of closely spaced grooves 83, which are relatively narrow and shallow. Adjacent grooves 83 are approximately parallel and they extend transversely of the rim 82. The function of the grooves 83 is disclosed and described in detail in applicant's Patent No. 3,245,272, the application Ser. No. 200,193 of which was copending with the parent application Ser. No. 312,970 of this application. Further details with respect to the function and advantages of said grooves 83 are also found in applicant's copending application Ser. No. 414,647, now patent No. 3,347,107 filed Nov. 30, 1964, entitled, "Devices Employing a Friction Drive Between Two Surfaces in a Liquid Medium."

From applicant's afore-mentioned patent and patent applications, it will be seen that the function of the grooves 83 in the rim 82 may be performed by corresponding grooves, not shown, on the surfaces of the disks 63 and 67, at least in the regions thereof engaged by the surfaces 81.

It will be readily understood that the specific examples given in the foregoing are not limiting in any respect and that many other means can be devised for the practical application of the present invention.

The embodiments of the invention in which an exclusive property or privilege is claimed are defined as follows:

1. A speed-changing unit, comprising:
   a drive shaft;
   drum means having wall means defining an annular, inwardly opening channel, said wall means including an annular end wall defining an opening into said drum means, said drive shaft extending through said opening;
   a plurality of radially tapered disks nonrotatably and axially slideably mounted upon said drive shaft within said drum means;
   ring means axially slideably and nonrotatably disposed within said channel, said ring means being interleaved with and continuously engaged by said disks, said ring means and said end wall having substantially coaxial, annular bearing surfaces near their radially inner edges slideably engageable with the axial surfaces of said disks adjacent thereto, the diameter of the opening in said end wall being not materially larger than the inside diameter of said ring means;
   bearing means rotatably supporting said drum means for rotation around an axis parallel with the axis of said drive shaft;
   pressure means disposed for engagement with the disk remote from said end wall for urging said disks and said ring means together and toward said end wall;
   a source of fluid lubricant and passage means for directing said lubricant into said channel in an amount in excess of the amount required to fill the channel, excess lubricant within said channel being discharged from said drum means through the opening in said end wall, whereby, when said drum means is rotated, said lubricant fills said channel to an effective level immersing said ring means; and
   actuating means for rotatably supporting said drive shaft and for effecting relative radial movement between said drum means and said drive shaft, whereby said speed changing is effected.

2. The structure according to claim 1, wherein said drum means includes a substantially coaxial chamber adjacent to and extending axially away from said remote disk;

wherein said pressure means includes a substantially cylindrical member axially slideably disposed within said chamber, said cylindrical member having an annular edge means engageable with said remote disk; and means disposed between portions of said cylindrical member and said drum means for urging said cylindrical member against said remote disk.

3. A speed-changing device for connecting a first shaft means to a second shaft means, comprising:

drum means defining an annular and radially inwardly opening channel, one side wall of said channel defining an opening into said drum means;

ring means axially slideably and nonrotatably disposed coaxially within said channel, said ring means and said side wall having substantially annular, coaxial and axially facing bearing surfaces near their radially inner edges, the radial distance between the opening in said side wall and the radially outer wall of said channel being not materially smaller than the distance between the radially inner edge of said bearing surfaces and said outer wall;

radially tapered disk means nonrotatably and axially slideably mounted upon said first shaft means, said disk means being interleaved with said ring means and having axial surfaces engaged by said annular bearing surfaces;

bearing means rotatably supporting said drum means for rotation around an axis parallel with the axis of said first shaft means;

pressure means disposed for engagement with the one of said disk means remote from said side wall for urging said disk means and said ring means toward said side wall;

a source of fluid lubricant and pasage means for directing said lubricant into said channel in an amount in excess of the amount required to fill the channel, excess lubricant being discharged from said drum means through the opening in said side wall, whereby, when said drum means is rotated, said lubricant fills said channel to an effective level substantially immersing said bearing surfaces; and means rotatably supporting said first shaft means and for effecting relative radial movement between said first shaft means and said drum means whereby said speed changing is effected.

4. A speed-changing device according to claim 3, wherein said passage means extends through said opening in said side wall; and wherein said pressure means is coaxially connected to and rotatable with said second shaft means.

5. A speed-changing device according to claim 3, wherein said pressure means comprises a substantially cylindrical member coaxially and nonrotatably connected to said second shaft means and having an annular edge means defining a bearing surface engageable with said disk means; and wherein said passage means extends lengthwise through said second shaft means and communicates with the interior of said drum means.

6. A speed-changing device according to claim 3, wherein said passage means comprises tube means independent of said shaft means and extending into the interior of said drum means.

7. A speed-changing device according to claim 3, wherein said bearing surfaces each have a plurality of closely spaced narrow and shallow grooves extending transversely of said bearing surfaces, adjacent grooves being slightly and outwardly divergent.

8. A speed-changing device according to claim 3, wherein said axial surfaces of said disk means have a plurality of closely spaced grooves arranged in an annulus substantially concentric with said first shaft means, said grooves being arranged for continuous engagement with said bearing surfaces, and adjacent grooves being slightly and outwardly divergent.

9. A speed-changing device for connection between first shaft means and second shaft means, the combination comprising:

first and second drum means, each drum means defining an annular, radially inwardly opening channel, one side wall of each channel defining an opening into said drum means;

ring means axially slideably and nonrotatably disposed coaxially within each channel, the side walls and said ring means having annular, coaxial bearing surfaces, the diameter of the opening in each side wall being not materially smaller than the minimum diameter of said bearing surfaces of the adjacent ring means;

first and second pressure means each having annular edge means respectively disposed within said first and second drum means remote from the side wall and substantially coaxial therewith, said second pressure means being nonrotatably and coaxially connected to said second shaft means;

intermediate shaft means coaxially and nonrotatably connected to said first pressure means;

a plurality of radially tapered disks nonrotatably and axially slideably mounted on said first shaft means within said first drum means and upon said intermediate shaft means within said second drum means, said disks being interleaved with said ring means and engaged with said bearing surfaces;

means urging said pressure means, said disks and said ring means toward said side walls;

a source of fluid lubricant and passage means for directing said lubricant into said channels in amounts in excess of the amount required to fill said channels, excess lubricant within each channel being discharged from its drum means through the opening in its end wall, whereby, when said drum means are rotated, said lubricant fills said channels to an effective level immersing said bearing surfaces;

bearing means coaxially and rotatably supporting said first shaft means and said second drum means; and pivot means supporting said first drum means for pivoting same transaxially of said first shaft means, whereby said speed changing is effected.

10. A speed-changing device according to claim 9, wherein said bearing surfaces have a plurality of closely spaced grooves arranged transversely of said surfaces, adjacent grooves being slightly and outwardly divergent.

References Cited

UNITED STATES PATENTS

| 2,815,670 | 12/1957 | Jorgensem | 74—199 |
| 3,099,927 | 8/1963 | Anderson | 74—199 X |
| 3,158,036 | 11/1964 | Hughson | 74—199 |

FOREIGN PATENTS 1,299,609  6/1962  France.

LAVERNE D. GEIGER, *Primary Examiner.*

E. J. EARLS, *Assistant Examiner.*